Oct. 9, 1928.

J. H. HUME

AIR HEATER

Filed Jan. 25, 1927

J. H. HUME 1,686,614

AIR HEATER

Filed Jan. 25, 1927

Patented Oct. 9, 1928.

1,686,614

UNITED STATES PATENT OFFICE.

JAMES HOWDEN HUME, OF GLASGOW, SCOTLAND.

AIR HEATER.

Application filed January 25, 1927, Serial No. 163,331, and in Great Britain December 30, 1926.

This invention relates to air heaters contrived to effect exchange of heat between hot gaseous medium, such as waste gases from a furnace, for example, and air to be heated or preheated, whether for supporting combustion or for drying or other purposes, of that class in which the air and gas streams are divided into sub-streams separated by conducting diaphragms with which they are brought in intimate contact, while flowing counter to one another.

The heater of the invention comprises in effect a cellular structure composed of shallow cells of large superficial area, with rows of air cells alternating with rows of gas cells, the diaphragms which separate the rows of air cells from the rows of gas cells being readily capable of assembly and as readily removable individually or in pairs or sets for repair or other purposes.

The air heater shown constitutes in effect a box-like structure built up of air cells alternating with rows of gas cells.

The walls of these cells are constituted by parallel or equidistant plates provided on at least one side with transverse ribs or spacing members thermally connected to the plates and serving to subdivide the shallow fluid streams separated by the plates, the ribs constraining the sub-streams to follow each its own course.

Figure 1:
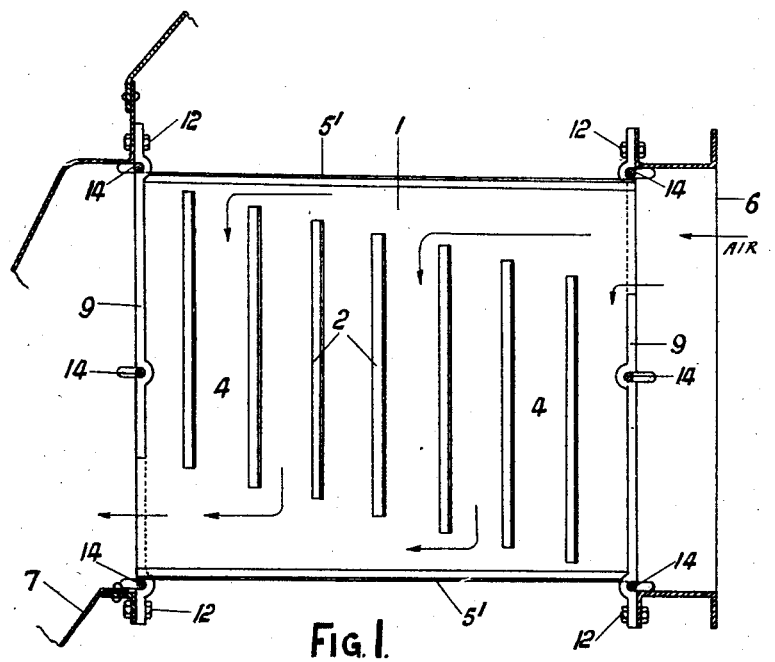
Fig. 1 is a vertical section on the line 1—1 of Fig. 3.
Figure 2:
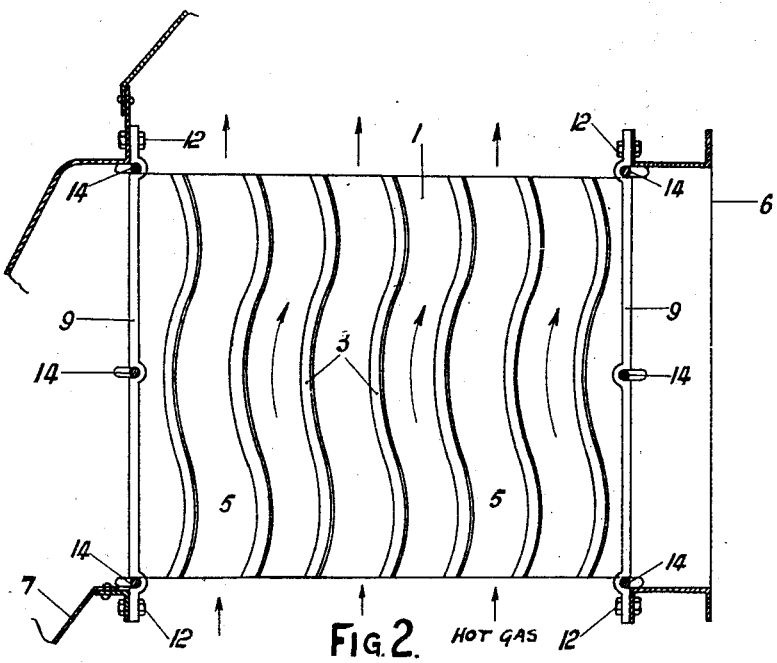
Fig. 2 is a vertical section on the line 2—2 of Fig. 3.
Figure 3:
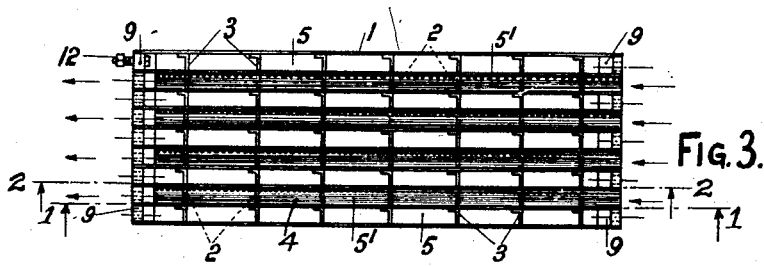
Fig. 3 is a plan view of a heater according to the invention.

As shown in Figs. 1, 2 and 3, plates 1, are arranged in parallel relation and are provided alternately with a stepped set of plane vertical ribs 2 and with a set of corrugated ribs 3 outstanding from the plate. The ribs 2 serve as partations between air cells 4, and the ribs 3 serve as partations between gas cells 5. Angle bars 5' are fitted along the top and bottom edge of the air cells 4. The ribs 3 may be plane instead of corrugated.

The collection of cells when erected may be interposed in a gas passage or flue or a smoke-box or the like, to which are connected an inlet branch 6 for cold air and an outlet branch 7 for preheated air; the gas inlet being on the underside and the gas outlet on top, though the flow may be reversed. Either medium may be impelled or induced by a fan or other means.

At the terminal edges the plates 1 are united to vertical bars 9 forming spacing members, said bars being engaged at the ends by bolts 12, which secure the plates to the wall of the flue or smoke box. The bars 9 are formed with recesses traversed by bolts 14 which serve when tightened to clamp the plates together with the metallic walls of each cell in close thermal contact, ensuring maximum conduction of heat across the metal besides isolating the air cells from the gas cells.

Assuming that a section or row of cells is to be temporarily withdrawn, the bolts 14 are slackened and shifted laterally out of the recesses. Then the bolts at 12 belonging to the plate to be removed are freed and the plate lifted (or it may be dropped) out of its assembled relation with the remaining plates.

Figure 4:
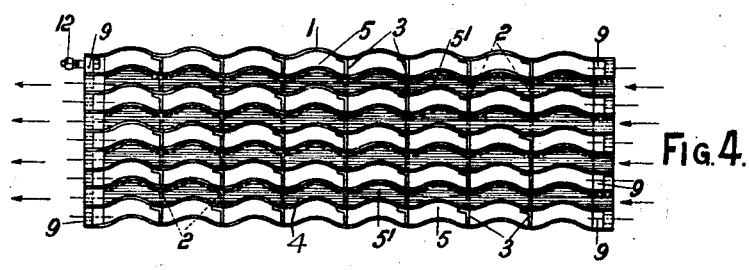
Fig. 4 is a plan view showing the modification in which the wall plates are corrugated.

Fig. 4 shows an arrangment in which the plates 1 are corrugated.

Figure 5:
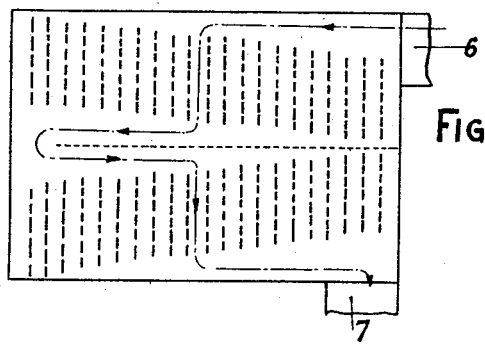
Fig. 5 is a diagrammatic elevation showing a variant.

Fig. 5 represents one of many possible variants in which with an arrangement of horizontal partitions the air may be caused to follow a zig-zag course, the air inlet and the air outlet being located at the same side.

Obviously, the number of possible variants may be multiplied.

In all cases the ribs forming partitions between the cells of a row are preferably so spaced apart as to permit convenient insertion of cleaning devices, so that the conducting surfaces may be kept clean in the interest of efficiency. Retarding devices or means for producing turbulence may be inserted in the gaps between adjacent plates or the ribs may be constructed as retarders.

A complete heater may comprise any desired number of sections which can be conveniently shipped and transported and readily assembled at the point of use. A plurality of such heater units may be arranged in series or in parallel, and provision may be made for passing the air through less than the total number of units.

Though in most cases it will be found convenient to construct the heater with the ribs disposed vertically, it will be understood that the ribs may be disposed horizontally. Also the plates may be disposed horizontally and adapted to be withdrawn laterally.

In the particular embodiment illustrated the plates are individually removable. It is understood, however, that a pair or set of adjoining plates may be united to form a shallow box removable as such. In this event the ribs or certain of the ribs of the plates or of certain of the plates will form the narrow walls of the relative boxes.

I claim:—

An air heater comprising a plurality of spaced plates having ribs serving to space the plates, the plates and ribs forming the walls of cells to be traversed by hot gases and by air to be preheated, each plate forming the base of a row of cells on each side, and means for clamping said plates together to form a unit permitting removal of at least one of said plates without disturbing the remaining plates.

In testimony whereof, I have signed my name to this specification.

JAMES HOWDEN HUME.